April 7, 1970            F. B. SCHELHORN            3,505,083
PACKAGING AND A METHOD OF PACKAGING PERISHABLE
COMESTIBLES FOR REFRIGERATION
Original Filed Sept. 9, 1963

INVENTOR.
FREDERICK B. SCHELHORN

ATTORNEYS

United States Patent Office 3,505,083
Patented Apr. 7, 1970

3,505,083
PACKAGING AND A METHOD OF PACKAGING PERISHABLE COMESTIBLES FOR REFRIGERATION
Frederick B. Schelhorn, Savannah, Tenn., assignor to Owens-Illinois, Inc., a corporation of Ohio
Continuation of application Ser. No. 307,387, Sept. 9, 1963, now Patent No. 3,342,613, dated Sept. 19, 1967. This application Jan. 3, 1967, Ser. No. 607,019
The portion of the term of the patent subsequent to Sept. 19, 1984, has been disclaimed
Int. Cl. B65b 25/06, 23/00
U.S. Cl. 99—171                          7 Claims

ABSTRACT OF THE DISCLOSURE

The invention relates to an improvement in the packaging of and an improved method for packing perishable comestibles for shipment under refrigeration in a water soaked condition in which the comestibles are wrapped in a blanket having a moisture absorbent material in contact with the water soaked comestibles with a thin film of plastic secured to the back of the water absorbent material by spots of bonding at widely spaced intervals, the water absorbent material and the plastic film being unconnected between the bonded spots so that the plastic film and the moisture absorbent material can move relative to each other in the unconnected areas to permit the plastic film to stretch independently of the moisture absorbent material to accommodate protuberances of the comestible.

---

This is a continuation of application Ser. No. 307,387, filed Sept. 9, 1963, now Patent No. 3,342,613.

This invention relates to wrapping comestible products, such as poultry, for refrigerated storage and shipment where it is necessary to enclose the product in an airtight, waterproof wrapper that will not rupture under impact and thereby permit dehydration and freezer burns.

Prior art wrappers of this type are generally in the form of a laminate consisting of an outer layer of impermeable plastic material bonded throughout its surface to an inner layer of moisture absorbent, non-woven fabric or paper. The latter type of wrappers have had limited success because of the inability of the extrusion process to provide a plastic film of sufficient thickness and strength to stand up in use on the back of the absorbent, non-woven material. The limited success has primarily been due to the fact that the outer film of impermeable, plastic material is bonded to the surface of the moisture absorbent material. Consequently, small bones of a fowl or other abrupt surface irregularities in the product may puncture the packaging material and thereby destroy the seal and permit dehydration of the product. The plastic outer layer is unable to stretch and accommodate the abrupt irregularities in the surface of the wrapped product due to its being bonded to the non-stretchable inner layer of moisture absorbent material.

One of the objects of this invention is to provide an air-tight, waterproof packaging material for comestibles that will prevent dehydration of the comestible and will not rupture under ordinary impact.

A further object is to provide a flexible, air-tight waterproof blanket or wrapper for poultry and similar comestible products including an inner layer of moisture absorbent material that will lie in close, surface-to-surface contact with the product to form a water cushion about the comestible and an outer, impermeable layer of stretchable material that can move relative to the inner layer to accommodate abrupt surface irregularities and thereby resist puncture.

Another object lies in the provisions of an impermeable blanket for comestibles in which an outer layer of air-tight, waterproof, stretchable material is capable of limited relative movement with respect to an inner layer of moisture absorbent fibrous material to increase the strength of the blanket.

The foregoing and other objects are achieved by the provision of an outer layer of plastic material, such as polyethylene or polyvinyl chloride film, to which is bonded at spaced points an inner layer of moisture absorbent, non-woven material such as wet strength towelling grade paper. The inner layer of paper is spot-bonded to the plastic film by a suitable waterproof glue such as polyvinyl acetate with the result that the film and paper are capable of relative movement in the unbonded areas. The aforementioned materials are exemplary only, and the invention is not limited thereto.

Figure 1:
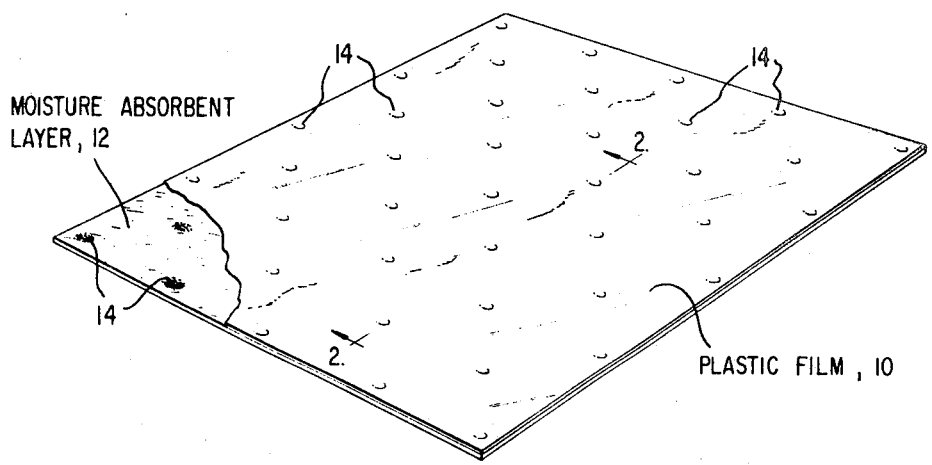
Figure 2:
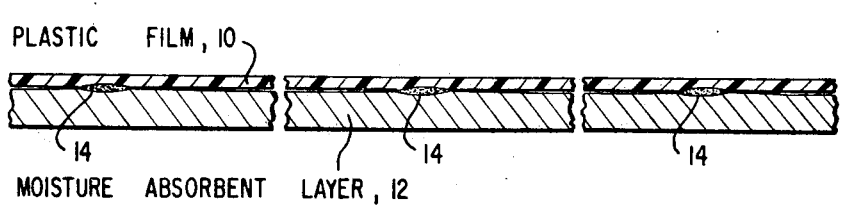

Other objects and advantages will become apparent from the following description taken in connection with the accompanying drawing in which FIG. 1 is a perspective view of a wrapper or blanket embodying the invention, and FIG. 2 is a magnified, diagrammatic sectional view taken on lines 2—2 of FIG. 1 illustrating the location of the adhesive material.

As shown in the drawing, the plastic film 10 is secured to the moisture absorbent material 12 by substantially uniformly distributed spots 14 of a waterproof adhesive. The thickness of the plastic film preferably may vary from 3 mils to 5 mils and the spacing of the bonding spots 14 may be varied as desired.

In the wrapping of poultry and similar products, the product is washed and, while soaked with water, is wrapped in the blanket with the moisture absorbent layer 12 next to the product. The capillary action of the water causes the non-woven material to adhere closely to the surface of the product and form a water cushion therearound. The film 10 of plastic material is impermeable and forms an air-tight seal around the product to prevent dehydration and freezer burns. Since the plastic film 10 and absorbent material 12 are spot bonded together, relative movement is permitted between the absorbent layer and the plastic film in the unbonded areas between the spots of adhesive. Consequently, the plastic film is able to stretch around abrupt irregularities in the surface of the product independently of the absorbent layer and will not puncture.

With respect to a specific example of the preferred embodiment of this invention, I prefer to use a low density polyethylene film having a thickness of approximately three mils. The film is electrostatically treated or flame treated on one surface to improve the adhesive bonding characteristics of that surface. A film of this type can be elongated 350% in either planar direction before rupturing.

While any suitable adhesive can be employed, I prefer to use a highly plasticized polyvinyl-acetate based adhesive having a viscosity of 3400–3600 centipoises at 25° C. For a rectangular blanket having a size of 48" by 54", the adhesive is applied in a uniform pattern as ½" squares or ½" diameter circular spots located on 2" centers.

The preferred absorbent material is slightly creped wet-strength paper towelling having a basis weight of eight pounds per thousand square feet. The wet-strength additive is a urea-formaldehyde polymer. A paper of this type is marketed by Brown Company of Berlin, N.H. under the designation #2200 towelling. This towelling, which is typical, will under maximum load, elongate 4.3% in the machine direction and 3.9% in the cross-machine direction. Comparing the foregoing with the permissible elongation in plastic film, it can be readily seen that plastic film will stretch without rupturing, when permitted to do so, to a far greater degree than the absorbent material. Continuity of the plastic film in a blanket of this type is of primary importance.

Additionally, comparative tests give the unexpected result that there is a 33% improvement in the wicking characteristics of the blanket in going from overall lamination to spot lamination. This characteristic is important in maintaining uniform disposition of the liquid about the packaged comestibles.

While I have described and illustrated one embodiment of my invention, I wish it understood that I do not intend to be restricted solely thereto but that I do intend to cover all modifications thereof which would be apparent to one skilled in the art and which come within the scope and spirit of the invention.

What is claimed is:

1. In a package for the storage and shipment under refrigeration of water soaked, perishable comestibles having protruding, abrupt surface irregularities in which the comestibles are wrapped within a wrapper comprising an outer layer of plastic material bonded to an overlying water absorbent sheet wrapped in surface-to-surface contact around the comestibles to form a water cushion therearound, the improvement wherein said sheet is a highly coherent, single ply sheet of paper having a wet strength additive, said plastic material is a thin film of plastic stretchable up to approximately 350 percent without rupture, and the bonding comprises spots of water-proof adhesive located between said sheet and plastic film at widely spaced intervals approximating two inches between centers and greater than the breadth of said abrupt irregularities with the extent of the spot bonded areas being less than one-sixth of that of the unbonded areas and each said bond being a tight, integral structure developing substantially the tear strength of the full thickness of said sheet such that the unbonded areas of said sheet and plastic film between the firmly attached bonded areas are movable independently relative to each other and the unbonded portions of plastic film will stretch to accommodate said abrupt irregularties of the wrapped comestibles.

2. A package for the storage and shipment under refrigeration of perishable comestibles having protruding, abrupt surface irregularities, said package comprising said comestibles in a water soaked condition enclosed within a composite, water-proof wrapper tightly folded therearound to fit within a container, said wrapper comprising a single ply sheet of highly coherent, slightly creped, water absorbent paper towelling with a wet-strength additive and having a basic weight of approximately eight pounds per thousand square feet, a thin, stretchable film of moisture vapor impermeable plastic material underlying said sheet, and spots each approximately one-half square inch in area of waterproof adhesive between said paper sheet and plastic film bonding said sheet to said film at widely spaced intervals with each bonded spot being a tight integral structure developing substantially the tear strength of the full thickness of said paper sheet, the intervals between the bonded areas being approximately two inches between centers and greater than the breadth of said comestible abrupt irregularities, said paper sheet lying in surface-to-surface contact with said water soaked comestibles to form a water cushion therearound with the outer plastic film being movable independently of said paper sheet and stretching between said bonded areas to accommodate said protruding irregularities of the comestibles, thereby maintaining the watertight integrity of said package.

3. The package described in claim 2 wherein the wet-strength additive is a urea-formaldehyde polymer.

4. The package described in claim 2 wherein said plastic film is surface treated on one side to improve the adhesive bonding characteristics.

5. The package described in claim 2 wherein said plastic film is a low density polyethylene material having a thickness less than five mils.

6. The package described in claim 5 wherein said adhesive is a highly plasticized polyvinyl-acetate based adhesive having a viscosity of approximately 3400–3600 centipoises at 25° C.

7. A method of packaging perishable comestibles having protruding, abrupt surface irregularities comprising the steps of washing the comestibles in water, while soaked with water laying the comestibles on the top surface of the water absorbent portion of a composite, waterproof wrapper, said wrapper being a highly coherent sheet of single ply, water absorbent paper bonded at widely spaced intervals greater than the width of said comestible protruding irregularities to an overlying thin, stretchable film of waterproof plastic material by widely spaced apart spots of adhesive adhering the paper and plastic in a plurality of bonded spots each developing essentially the tear strength of the full thickness of said paper, folding said wrapper around said comestibles to enclose said comestibles completely within said wrapper with said paper sheet lying in surface-to-surface contact with said water soaked comestibles to form a water cushion therearound and the plastic film outermost, and causing said plastic film to move and stretch independently of said paper sheet between bonded spots to accommodate the protruding irregularities of the comestibles.

References Cited

UNITED STATES PATENTS

| | | | |
|---|---|---|---|
| 2,670,315 | 2/1954 | Rider | 161—146 |
| 3,047,445 | 7/1962 | Gresham | 161—148 |
| 3,342,613 | 9/1967 | Schelhorn | 99—171 |

A. LOUIS MONACELL, Primary Examiner

W. C. LAWTON, Assistant Examiner

U.S. Cl. X.R.

99—174; 156—290; 161—148, 250